3,005,787
SUBBING LAYER FOR POLYCARBONATE
FILMBASE
James R. Waring and Russell P. Easton, Binghamton, N.Y., assignors to General Aniline & Film Corporation, New York, N.Y., a corporation of Delaware
No Drawing. Filed June 6, 1960, Ser. No. 33,925
5 Claims. (Cl. 260—8)

The present invention relates to the subbing of hydrophobic, dimensionally stable, inert-surfaced filmbases which per se refuse to bond to a hydrophilic overcoating such as an N.C. layer or a light-sensitive photographic silver halide emulsion and, more particularly, to the subbing of polycarbonate filmbase.

Polycarbonate resins have been known for some time but their use in forming photographic filmbase is in its infancy. Polycarbonate resins may be made by various methods such as by reacting diphenyl carbonate or phosgene with 2,2'-bis(4-hydroxyphenyl)propane or by reacting such propane with its bis-chlorocarbonic acid ester. Literature which describes the preparation of polycarbonates are, for example, Belgian Patents 532,543, 546,375, 546,376, 546,377, 553,614, 555,894 and 560,610; French Patents 1,152,155 and 1,152,156; German Patents 959,479 and 1,024,710; and U.S. Patent 2,799,666.

Polycarbonate resins have properties both physical and chemical which should highly recommend them for use as a dimensionally stable photographic filmbase. However, due to the difficulty of securing a strong bond between the base and a hydrophilic layer on the base such as an N.C. layer or a light-sensitive photographic emulsion and the inadequacy of the usually employed photographic filmbase subs, their use in photography has been greatly curtailed.

It has been previously proposed to sub polycarbonate filmbase and in this connection reference is made to U.S. Patent 2,874,046. However, in the preferred method of this patent, it was found necessary to use three layers for the sub; to wit, a polyester layer on the base, an intermediate nitrocellulose layer and a gelatin overcoating on the nitrocellulose layer. The use of three separate solutions to lay down these three coatings is manifestly costly and time consuming.

We have now found that an excellent bond between polycarbonate filmbase and a hydrophilic colloidal overcoating can be produced by a single layer sub while using as the subbing solution an aqueous-organic solvent composition containing as its essential components a lower alkylene carbonate, a water soluble colloid particularly gelatin and a water insoluble resin capable of forming a self-sustaining film.

Such a solution and a single subbing layer capable of producing a very tight bond between polycarbonate filmbase and a hydrophilic colloidal overcoating constitute the purposes and objects of our invention.

The use of the lower alkylene carbonate is absolutely essential to obtain adhesion between the hydrophilic colloidal overcoating and the filmbase. If the other components of our solution be employed but the lower alkylene carbonate be omitted, no adhesion can be obtained. Preferably, we use as the lower alkylene carbonate, propylene carbonate, but resort may be had to ethylene carbonate although the results are not as good if the latter be employed. The alkylene carbonate is usually present in the subbing solution in an amount of 60-75 cc. per 100 cc. of the solution. However, the lower alkylene carbonates, particularly propylene carbonate, are rather expensive solvents and it is possible to reduce the quantity of the same by the addition of diluents such as methanol, ethanol, diacetone alcohol, acetone or butyl Cellosolve. Typically, the quantity of the carbonate may be reduced to 40 cc. per 100 cc. of the coating solution when employing about 43 cc. of the organic solvent diluent.

Another essential component of the subbing solution, to wit, gelatin, is used in an amount of from about 1 to .5 gram per 100 cc. of solution. The gelatin has the important function of imparting a degree of water receptivity to an otherwise hydrophobic layer. This aids in bonding the filmbase to a hydrophilic colloidal overcoating on the subbing layer such as an N.C. layer or the silver halide photographic emulsion.

The other essential component of the subbing solution is a film-forming resin and as such component we utilize nitrocellulose on the one hand and a copolymer of a lower alkyl acrylate and a lower alkyl methacrylate on the other hand. Preferably, the lower alkyl group contains up to two carbon atoms and, hence, the monomers used may be methyl acrylate, methyl methacrylate, ethyl acrylate and ethyl methacrylate. Copolymers made from a major quantity of ethyl acrylate and a minor quantity of methyl methacrylate give exceedingly good results. However, other copolymers, including methyl acrylate - methyl methacrylate, methyl acrylate - ethyl methacrylate, methyl acrylate-methyl methacrylate and ethyl acrylate-ethyl methacrylate are satisfactory.

To improve the bonding of the substrate to the hydrophilic colloidal overcoating thereon, it is advisable to use a small amount of a hardening agent such as glyoxal dissolved in an aqueous organic solvent such as a mixture of water and methanol. The glyoxal serves to cross-link the gelatin in the substrate with the gelatin in the overcoat on the substrate. The quantity of glyoxal may range from about .002 to .01 gram per 100 cc. of the subbing solution.

The solvent system we employ is primarily organic and, hence, we find it desirable to use a dispersing agent to disperse the gelatin in the subbing solution. To this end, resort may be had to an organic acid such as phthalic acid, acetic acid, salicylic acid or the like. The quantity of the acid used for dispersing the gelatin amounts to about .5 to .2 gram per 100 cc. of the solution.

Various organic solvents may be used in the coating solution such as those previously mentioned, i.e., methanol, ethanol, diacetone alcohol, acetone or butyl Cellosolve. The quantity of the solvent will be that which will hold the various components in solution for coating.

It might be noted that the ratio of the film-forming resin and the gelatin employed is not critical. While ranges have been given for these components, they may be modified according to the skill of the operator to provide a solution which may be coated on the filmbase and which when dried out will give a very strong bond between the filmbase and any hydrophilic overcoating on the subbing layer.

In preparing the subbing solution, we have found it advisable to make up the solution in three parts: Part 1 of which will contain the gelatin; part 2 the lower alkylene carbonate; and part 3 the film-forming resin. Part 1 is warmed and added to part 2 with stirring. Part 3 is then added to the resulting solution of parts 1 and 2. The resulting solution may then be coated in a conventional manner on the polycarbonate filmbase and the coating dried. Hydrophilic colloids such as photographic silver halide emulsions or gel overcoatings may then be laid down on the substrate and dried. It will be found that the gel overcoating will be very tightly bonded to the substrate and the substrate in turn firmly bonded to the polycarbonate filmbase.

The following examples will illustrate our invention but it is to be understood that the invention is not restricted thereto.

Example I

*Part 1.*—1.2 gram of gelatin is dissolved in 3.4 cc. of water. To this solution there is added 4.1 cc. of a 10% solution of phthalic acid in methanol and 8.1 cc. of methanol.

*Part 2.*—To .2 cc. of a 4% glyoxal solution in aqueous methanol there were added 70.6 cc. of propylene carbonate.

*Part 3.*—To 6.2 cc. of 10% ½ sec. SS cellulose nitrate in methanol are added 6.2 cc. of a 10% solution of a copolymer of ethyl methacrylate and methyl acrylate in acetone.

Part 1 was warmed and added to part 2 while stirring. Part 3 was then added to the solution of parts 1 and 2. The resulting homogeneous solution was coated on polycarbonate filmbase and the coating dried. When the substrate prepared as above was overcoated with a gelatino silver halide emulsion and dried, it was found that all layers were very firmly bonded together.

Example II

*Part 1.*—.7 gram of gelatin was dissolved in 1.9 cc. of water and to this solution there were added 2.3 cc. of 10% acetic or phthalic acid in methanol and 4.6 cc. of methanol.

*Part 2.*—.1 cc. of 4% glyoxal in aqueous methanol was added to a solution of 40 cc. of propylene carbonate and 43.4 cc. of methanol.

*Part 3.*—3.5 cc. of a 10% ½ sec. SS cellulose nitrate in methanol was added to 3.5 cc. of a 10% solution of the copolymer of Example I. The three solutions were added together as in Example I and coated on polycarbonate filmbase. After drying, the substrate was coated with a gelatin layer and it was found that after drying, all layers were firmly bonded together.

Modifications of the invention will occur to persons skilled in the art. Thus, in lieu of methanol, resort may be had to such solvents as ethanol, diacetone alcohol or butyl Cellosolve. Similarly, the copolymer in part 3 of the solution of Examples I and II may be replaced by other copolymers of the lower alkyl acrylates and lower alkyl methacrylates previously mentioned. We, therefore, do not intend to be limited in the patent granted except as necessitated by the appended claims.

We claim:

1. A subbing solution for bonding a hydrophilic colloid to a polycarbonate filmbase comprising an aqueous organic solvent solution containing as its essential components gelatin, a lower alkylene carbonate, cellulose nitrate and a copolymer of a lower alkyl acrylate and a lower alkyl methacrylate.

2. A subbing solution for bonding a hydrophilic colloid to polycarbonate filmbase comprising an aqueous organic solvent solution containing gelatin, an organic acid as a dispersing agent for gelatin, a lower alkylene carbonate, cellulose nitrate and a copolymer of a lower alkyl acrylate with a lower alkyl methacrylate.

3. A subbing solution for bonding a hydrophilic colloid to polycarbonate filmbase comprising an aqueous organic solvent solution containing gelatin, an acid selected from the class consisting of phthalic acid, acetic acid and salicylic acid, a low boiling organic solvent, a lower alkylene carbonate, glyoxal, cellulose nitrate and the copolymer of ethyl methacrylate and methyl acrylate.

4. A multilayer material comprising a polycarbonate filmbase having on one surface thereof a dry, single subbing layer containing as its essential components gelatin, cellulose nitrate and a copolymer of a lower alkyl acrylate and a lower alkyl methacrylate.

5. The article as defined in claim 4 wherein the copolymer is ethyl methacrylate and methyl acrylate.

No references cited.